United States Patent
Zehr et al.

(10) Patent No.: US 10,963,939 B1
(45) Date of Patent: Mar. 30, 2021

(54) COMPUTER VISION BASED STYLE PROFILES

(71) Applicant: A9.com, Inc., Palo Alto, CA (US)

(72) Inventors: Andrea Joyce Diane Zehr, Palo Alto, CA (US); Aishwarya Natesh, Mountain View, CA (US); Sharmila Nagaraja Reddy, Fremont, CA (US); Pinkee Rasik Patel Gupta, San Mateo, CA (US); Whitney Chan, San Jose, CA (US); Son D. Tran, Mountain View, CA (US); Deborah S. Hoo, Newark, CA (US); Smita Malaviya, Cupertino, CA (US)

(73) Assignee: A9.com, Inc., Palo Alto, CA (US)

( * ) Notice: Subject to any disclaimer, the term of this patent is extended or adjusted under 35 U.S.C. 154(b) by 198 days.

(21) Appl. No.: 16/113,645

(22) Filed: Aug. 27, 2018

(51) Int. Cl.
*G06Q 30/00* (2012.01)
*G06Q 30/06* (2012.01)
*G06Q 50/00* (2012.01)
*G06K 9/62* (2006.01)

(52) U.S. Cl.
CPC ....... *G06Q 30/0625* (2013.01); *G06K 9/6256* (2013.01); *G06K 9/6268* (2013.01); *G06Q 30/0603* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,103,551 B2* | 1/2012 | Saul | G06Q 30/02 705/26.1 |
| 8,798,362 B2* | 8/2014 | Wang | G06F 16/5838 382/165 |
| 9,020,250 B2* | 4/2015 | Singh | G09B 19/0076 382/165 |
| 9,710,841 B2* | 7/2017 | Ainsworth, III | G06Q 30/0631 |
| 10,109,051 B1* | 10/2018 | Natesh | G06K 9/4652 |
| 10,540,697 B2* | 1/2020 | Mao | A61B 5/44 |
| 10,706,450 B1* | 7/2020 | Tavernier | G06F 16/9535 |
| 10,776,417 B1* | 9/2020 | Ravichandran | G06N 3/02 |
| 2003/0065590 A1* | 4/2003 | Haeberli | G06T 11/60 705/26.5 |

(Continued)

OTHER PUBLICATIONS

Edward Shen et al. "Fashion Recommendation and Social Networking based on Commonsense Computing" CHI 2006, Apr. 22-27, 2006, Montreal, Canada (Year: 2006).*

*Primary Examiner* — Naeem U Haq
(74) *Attorney, Agent, or Firm* — Hogan Lovells US LLP

(57) ABSTRACT

Various embodiments provide techniques for generating a style profile in which items are recognized in image data, analyzed for their attributes, and categorized based on those attributes. In various embodiments, computer vision techniques can be used to analyze the image data and subsequent image data to update the generated style profiles. The style profiles may be associated with a person, event, or the like and provide users with items having similar characteristics or attributes, which may be available for purchase in an electronic marketplace. The style profiles may be updated by analyzing user interaction with the provided items and by receiving additional image data. Additionally, recommendations may be provided based on search queries that identify certain events or style profiles.

17 Claims, 12 Drawing Sheets

(56) References Cited

U.S. PATENT DOCUMENTS

| | | | | |
|---|---|---|---|---|
| 2009/0116698 A1* | 5/2009 | Zhang | .............. | G06Q 30/0601 |
| | | | | 382/111 |
| 2011/0184831 A1* | 7/2011 | Dalgleish | .............. | G06Q 30/02 |
| | | | | 705/26.7 |
| 2013/0236065 A1* | 9/2013 | Wang | .............. | G06K 9/64 |
| | | | | 382/111 |
| 2013/0343615 A1* | 12/2013 | Zhang | .............. | G06K 9/00664 |
| | | | | 382/111 |
| 2014/0019264 A1* | 1/2014 | Wachman | .............. | G06Q 30/0276 |
| | | | | 705/14.72 |
| 2014/0118396 A1* | 5/2014 | Sugita | .............. | G06T 11/00 |
| | | | | 345/630 |
| 2015/0170250 A1* | 6/2015 | Dalal | .............. | G06Q 30/0641 |
| | | | | 705/26.7 |
| 2015/0186419 A1* | 7/2015 | Agrawal | .............. | G06Q 30/02 |
| | | | | 707/722 |
| 2016/0335711 A1* | 11/2016 | Hickman | .............. | G06Q 30/0631 |
| 2017/0109609 A1* | 4/2017 | Hill | .............. | G06K 9/6215 |
| 2018/0075323 A1* | 3/2018 | Kouchnir | .............. | G06K 9/00624 |
| 2019/0139120 A1* | 5/2019 | Agrawal | .............. | G06K 9/2054 |
| 2019/0220694 A1* | 7/2019 | Biswas | .............. | G06K 9/6202 |
| 2020/0258145 A1* | 8/2020 | Beckham | .............. | G06T 19/006 |

* cited by examiner

COMPUTER VISION BASED STYLE PROFILES

BACKGROUND

Advancements in electronic commerce (e-commerce) technology have made it more and more convenient for consumers to purchase apparel items. Not only has e-commerce enabled consumers to browse catalogs of an ever-increasing number of retailers, but it has also enabled peer-to-peer marketplaces, which allows users to post items for sale that can be purchased by other users. Moreover, consumers may further be exposed to more and more options of apparel items, for example through media outlets or social media. Consumers may be interested in apparel items worn by certain persons, but may have difficulty identifying the items in a textual search.

BRIEF DESCRIPTION OF THE DRAWINGS

Various embodiments in accordance with the present disclosure will be described with reference to the drawings, in which.

DETAILED DESCRIPTION

Figure 1A:
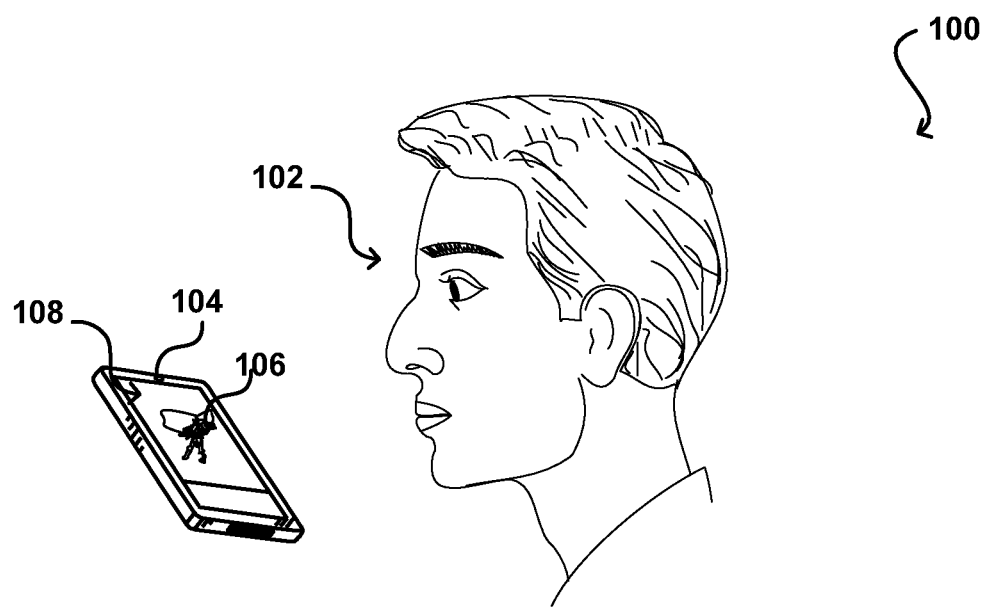
FIG. 1A illustrates an example scenario in which various embodiments of the present disclosure may be utilized.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for object recognition and categorization. In particular, various embodiments provide techniques for identifying objects in image data, extracting features from the identified objects, and categorizing the objects and/or features into a theme or style associated with the objects or features. In particular, various embodiments may be utilized to generate a style profile, or the like, for a consumer associated with inspirations (e.g., image data including one or more features the consumer is interested in, text search queries, and the like). Furthermore, in various embodiments, style profiles may be generated for special events or functions (e.g., formal events, events at particular locations, and the like). In various embodiments, computer vision techniques can be used to identify individual clothing items from an image or video, provided by a user in certain embodiments. At least some of the items may be partially obscured, for example positioned behind other items, at an odd viewing angle, shadowed, partially modified, or the like. Through the present techniques, the clothing items may be identified and one or more features may further be extracted from the clothing items. These extracted features may be categorized and formulated into a style profile associated with the image data (e.g., inspirations). Thereafter, recommended apparel items corresponding to the style profile may be presented to the user. In this manner, the user may provide inspirations for a particular style found desirable, but which may be difficult to describe via a text search.

In various embodiments, an initial image or plurality of images (e.g., still image, video) of one or more items may be captured and received. For example, the initial image may include an image or video of a person in a real-world situation, such as walking down the street or in a restaurant. Furthermore, in various embodiments, the initial image may include an image or video of a person in a stylized situation, such as a photographic shoot. Additionally, it should be appreciated that, in various embodiments, the initial image may not be captured by a user, but rather, may be obtained and received, for example, via photographs or videos that may be obtained from a source, such as the Internet. Furthermore, the image data may also correspond to particular features or attributes, such as an artistic painting or sculpture of a particular color or design. In various embodiments, the initial image may include an image of a person wearing an apparel item. The apparel item may be positioned on the person in a variety of ways, as the position of the person may be different in different images. For example, a pair of pants may look different as a person walks, sits, stands, or lays down. The initial image may be analyzed and individual items of the collection can be detected. In various embodiments, the individual items may be detected using an object detection model. In some embodiments, the individual items may be detected based on edge detection or other techniques through which pixels or a region of the initial image may be determined to pertain to an individual item. In some embodiments, a machine learning model, such as a neural network based model may be used to detect the individual items. Such a model may be trained using training images of similar scenes, in which the training images are annotated with information such as the number and location of individual items present in the training images. The initial image may be analyzed and individual items, or features of the individual items, can be detected.

Through further analysis, some respective attributes (e.g., features) of the detected individual items may be determined. For example, a color or pattern of an individual item may be determined. Additional attributes that may be determined include item type (e.g., dress, pants, t-shirt), item style (e.g., business, casual, cold weather), size, texture, brand, style classification, color, material, pattern, or length, among others. In various embodiments, one or more respective attributes for an individual item may be determined using a machine learning model, such as the abovementioned neural network based model, which analyzes the portion of the initial image identified as pertaining to the individual item to extract features therefrom. The features may then be analyzed to determine the one or more attributes. Since the individual items may be positioned in a configuration in which portions of certain items may be obstructed or hidden, it may be the case that some attributes of an item may not be able to be determined, or have a low degree of certainly, thus resulting in an incomplete data profile for that item.

In some embodiments, a user may optionally be prompted to provide data, such as some of the indeterminable attributes to complete the data profile for each item in the collection. Furthermore, in various embodiments, the user may optionally be prompted to direct or otherwise guide the identification, extraction, and classification process. For example, the user may upload a photograph of a celebrity wearing an outfit, but only be interested in the shoes worn by the celebrity. As such, the user may provide an indication (e.g., draw an area around the shoes, type in the word "shoes", select extracted items from a list, etc.) as to which item is desirable in the initial image. Additionally, in various embodiments, the user may upload a color swatch or a painting including a particular desirable color. Because the color swatch may be substantially featureless, the user may identify, to the system, that the color is the desirable attribute from the image data. In this manner, resources may be saved by analyzing particular regions of the image. Furthermore, the user experience may be improved by evaluating the specific items desired by the user.

In various embodiments, style profiles may be generated and/or refined based on analysis of a plurality of images, search queries, purchase history, browsing history, interaction events, and the like. For example, in various embodiments, a user may capture or upload a series of images of persons at a particular event, such as a formal event. The images may include different persons, each wearing different apparel items. However, in various embodiments the user may specify that each image is associated with the same profile. As such, the objects and/or attributes extracted from the images may be associated with the same style profile. For example, in various embodiments, seemingly unrelated items may be correlated to the same style profile based on the user identification. By way of example, a pink colored gown may be uploaded along with a pink pair of exercise shorts. In various embodiments, the classifier may recognize that the gown and exercise shorts are not necessarily correlated, but may nonetheless recognize the color as being important in both images, and as a result, may utilize that corresponding or matching attribute to update the style profile. Moreover, in various embodiments, the objects and/or attributes may automatically be associated with a particular style profile, for example via a classifier that may be trained by one or more machine learning techniques. Additionally, the user may further provide text queries to refine profiles, such as indicating certain items (e.g., shoes, belt, etc.) or additional attributes (e.g., color, material, etc.). Accordingly, style profiles may be generated and/or refined from a series of images.

In various embodiments, style profiles may be utilized in order to provide recommendations to users. For example, the style profiles may include a plurality of apparel items, which may be categorized (e.g., by type of item, pattern, cost, fit, etc.). Thereafter, the user may submit a query, which may be associated with the style profile or incorporate the style profile. As a result, recommended items, based on the style profile, may be provided for browsing and purchase to the user. In various embodiments, the style profile may be incorporated to find items having a lower cost than ones utilized to generate the style profile. Moreover, the style profile may be incorporated to find items that fit similarly as the ones used to generate the style profile, however, for different sizes or body types (e.g., a skirt having a certain length for a tall/short user, a dress having a certain fit, etc.). In certain embodiments, the user may provide biometric information (e.g., height, weight, measurements, typical sizes worn, etc.) to further refine the recommendations for the user. As such, the user may present the query in plain text or general terms, such as "I need a dress for a beach wedding" and one or more style profile associated with beach wear, formal wear, weddings, or the like may be utilized to provide recommendations to the user.

Various other features and applications can be implemented based on, and thus practice, the above described technology and presently disclosed techniques. Accordingly, approaches in accordance with various embodiments provide techniques that enable an improvement to computer vision technology. In real world applications of computer vision, objects may be positioned organically, rather than specifically arranged for the purpose object detection. Thus, one particular shortcoming in computer vision technology is the ability to perform object recognition, or otherwise ascertain information about an object, from images in which the view of object is obstructed or otherwise incomplete. The present techniques aim to overcome this challenge in at least some circumstances by identifying matching objects in multiple images, obtaining attribute data from the multiple images respectively, and stitching the data together to provide object recognition or attribute detection of the object. Additionally, over time, the application of such techniques can train models to determine more object attributes, lending to better object recognition, from images in which objects are partially obscured, or having otherwise traditionally challenging views. Improvements to computer vision and object recognition techniques are inherently an improvement to computing technology as it improves and/or provides new capabilities of computing machines. Various other applications, processes, and uses are presented below with respect to the various embodiments, each of which improves the operation and performance of the computing device(s) on which they are implemented.

Moreover, the present techniques aim to overcome the challenges associated with txt based descriptions for aspects of items, such as apparel items. Users may like "that person's style" without being able to verbalize particular aspects of the style that they like or how they would like to incorporate those aspects into their own wardrobe. As such, the present techniques aim to overcome this challenge in at least some circumstances by identifying matching or corresponding objects or attributes in images and categorizing those objects or attributes together to generate the style profile. Data may be stitched together from a plurality of images, which may include some context as to situations where the items were worn, to further enable classification and grouping of the objects or attributes. Additionally, over time, the application of such techniques can train models to determine classifications or categorizations of objects or attributes, lending to better object recognition, from images where different objects or attributes may be present, but their association with one another may be difficult to describe. Improvements to computer vision and object recognition techniques are inherently an improvement to computing technology as it improves and/or provides new capabilities of computing machines. Various other applications, processes, and uses are presented below with respect to the various embodiments, each of which improves the operation and performance of the computing device(s) on which they are implemented.

FIG. 1A illustrates a traditional search example environment 100. In this example, a user 102 is searching for various items using a computing device 104. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

In this example, using an appropriate application executing on computing device 104, the user 102 may want to enter a search query, but may have a difficult time articulating the parameters of the search query. For example, the user 102 may want to search for a particular style associated with a person or group. In various embodiments, the user 102 may have an image 106 arranged on a screen 108 of the computing device 104. The user 102 may wish to search for a style or object associated with, or similar to, one or more objects in the image 106. For example, the user 102 may want a shirt or shoes similar to the style shown in the image 106.

Figure 1B:
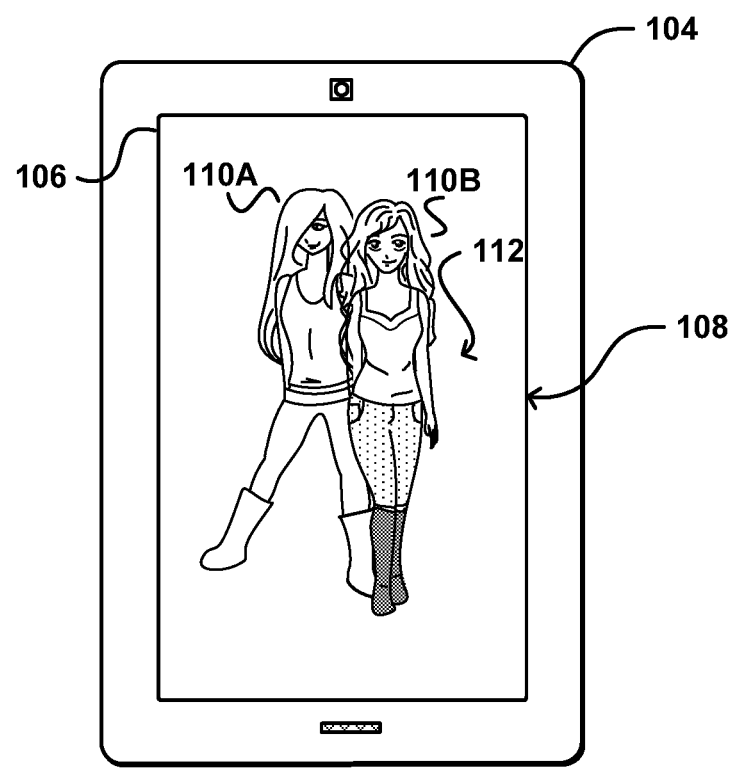
FIG. 1B illustrates an example scenario in which various embodiments of the present disclosure may be utilized.

FIG. 1B illustrates the screen 108 of the computing device 104 including the image 106. As shown, the image 106 includes two people 110A, 110B each wearing different apparel items 112. The user 102 may like the style associated with the person 110B. As used herein, style may correspond to a look or arrangement of an apparel item or other items in relation to other proximate items. For example, style may correspond to how a shirt looks together with a pair of pants. Additionally, in various embodiments, style may describe how a couch looks with an end table or painting. Because the user 102 may have difficulty describing the particular features of the person 110B that the user 102 likes, the user 102, in various embodiments, may provide one or more images of the person 110B and/or other images having a similar style for analysis to determine the objects and/or attributes associated with the style to receive recommendations.

Figure 2A:
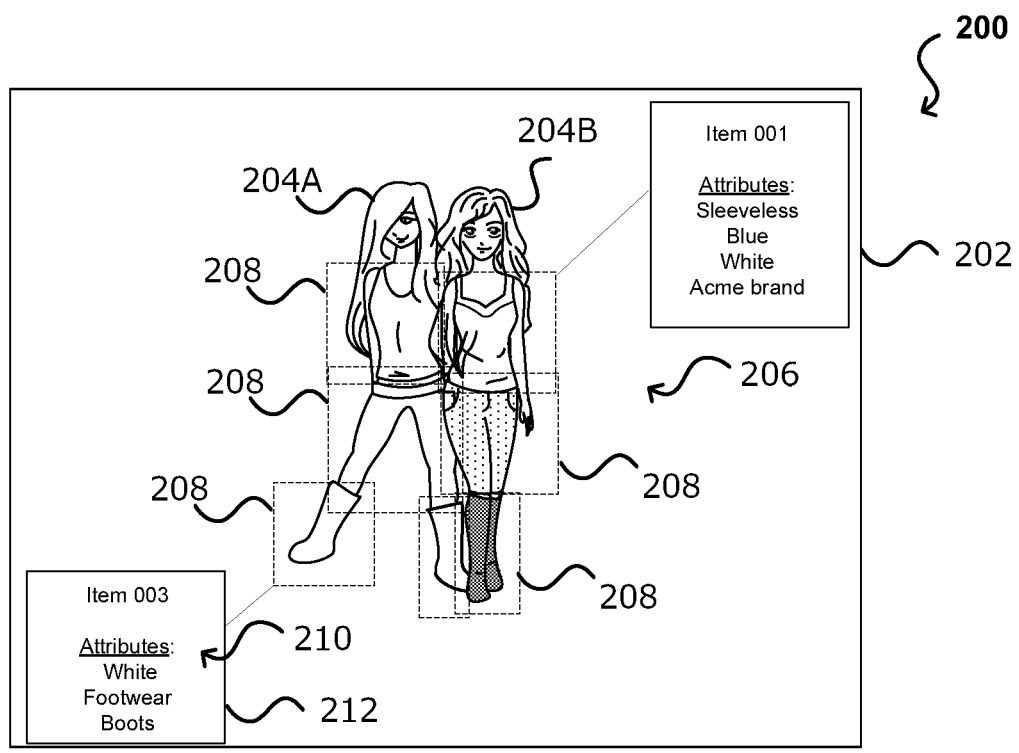
FIG. 2A illustrates an example representation of computer vision techniques for object identification and extraction, in accordance with various embodiments of the present disclosure.

FIG. 2A illustrates an example representation 200 of computer vision techniques for identifying, extracting, and categorizing one or more objects or attributes of objects, in accordance with various embodiments. In various embodiments, an initial image 202 (e.g., first image) of a plurality of images may be captured and/or obtained and received. It should be appreciated that, in various embodiments, the initial image 202 (or any subsequent images) may not be captured by the user, but rather, may be obtained via other sources, such as the Internet. For example, the user may obtain images from a blog post or photo gallery, such as a social media photo gallery, for use in determining the style profiles. In various embodiments, the initial image 202 and subsequent images, or the objects within the images, may be referred to as inspirations. Furthermore, in various embodiments, the initial image 202 may not be an image and may be a text query, auditory command, or the like.

The initial image 202 may be a video, a still image, a plurality of images stitched together spatially, or a plurality of images that include different persons, objects, or the like. In this example, the initial image 202 may include image data representing a view of two people 204A, 204B standing side by side. Each of the people 204A, 204B are wearing apparel items 206, such as tank tops, pants, and boots. As illustrated, the items 206 may be said to have a different "style" as the pants worn by person 204B are dotted, while the pants worn by person 204A are plain. The initial image 202 may be analyzed and individual items 208 of the apparel items 206 can be detected. In various embodiments, the individual items 208 may be detected using an object detection model (as represented by the dashed outlines). For example, it may be determined that the initial image includes a certain number of individual items. In some embodiments, the individual items 208 may be detected based on edge detection or other techniques through which pixels or a region of the initial image may be determined to pertain to an individual item. In some embodiments, a machine learning model, such as a neural network based model may be used to detect the individual items. Such a model may be trained using training images of similar scenes, in which the training images are annotated with information such as the number and location of individual items present in the training images.

The identified individual items 208 may be evaluated for one or more attributes 210 for formulation of an item profile 212. Item profile 212 for a plurality of items may be utilized to form a style profile corresponding to the objects in the initial image 202. Through further analysis, some respective attributes of the detected individual items may be determined. For example, a color or pattern of an individual item may be determined. Additional attributes that may be determined include item type (e.g., dress, pants, t-shirt), item style (e.g., business, casual, cold weather), size, texture, and brand, among others. In various embodiments, one or more respective attributes for an individual item may be determined using a machine learning model, such as the above-mentioned neural network based model, which analyzes the portion of the initial image identified as pertaining to the individual item to extract features therefrom. The features may then be analyzed to determine the one or more attributes. Since the individual items may be positioned in a configuration in which portions of certain items may be obstructed or hidden, it may be the case that some attributes of an item may be indeterminable, or have a low degree of certainly, thus resulting in an incomplete data profile for that item.

Furthermore, in various embodiments, different styles or formulations may be determined based on the item profiles 212. For example, in the illustrated embodiment, the person 204B is wearing boots with a sleeveless shirt. Accordingly, it may be determined that the boots are primarily fashion-related and not, for example, snow or work boots, which one would not typically wear with a sleeveless shirt. In this manner, different aspects of the style associated with the various items 208 may be determined. Moreover, different attributes or features of the items 208 may further be analyzed and combined to generate the style profile. A non-limiting example may include fit (e.g., loose, form fitting, athletic, etc.), pattern association (e.g., certain patterns with certain different patterns, patterns with colors, etc.), style mixing (e.g., business casual items mixed with casual items, formal items mixed with casual items, beachwear mixed with casual items, cold weather gear mixed with warm weather gear, etc.), and the like.

In some embodiments, a user may optionally be prompted to provide data, such as some of the indeterminable attributes to complete the item profile 212, an identification of the particular item the user is interested in, a text query for refining the item or attribute, or the like. In some embodiments, the style profile may be linked to a user account, such as a user account at an electronic marketplace, which includes data indicating engagement (e.g., clicks, likes, purchases) with one or more items offered for consumption. In some embodiments, one or more items identified in the initial image 202 may be matched to one or more items with which the user has interacted with on the electronic marketplace or which may be presented to the user in the electronic marketplace. For example, a list of purchased items may be searched to determine if any of the items in the initial image match any of the purchased items. If a match is determined, other items purchased along with the matched item may further be evaluated for matching attributes for building or refining the style profile.

It should be appreciated that, in various embodiments, it may be challenging to generate the style profile from a single image. Moreover, as noted above, apparel items arranged in organic positions (e.g., pictures of users walking down the street) may provide a limited and incomplete view of the items in an image capture. This presents a technical challenge as a shortcoming in current computer vision technology is the ability to perform object recognition, or otherwise ascertain information about an object, from images in which the view of object is obstructed or otherwise incomplete. This shortcoming further hinders the generation of style profiles, because objects and/or attributes may not be extracted. Furthermore, determining a general style may be difficult from the single image. As such, the present techniques aim to overcome this technical challenge by identifying objects in multiple images, obtaining attribute data from the multiple images respectively, and stitching the data together to provide object recognition or attribute detection of various objects. In various embodiments, the image data may be from a single person (e.g., a celebrity) and therefore, a profile of that particular person's style may be built over a series of images. Furthermore, in various embodiments, the image data may be from a particular event or situation (e.g., casual wear, beach wear, formal wear, etc.) and therefore style profiles indicative of the events or situations may be generated.

Figure 2B:
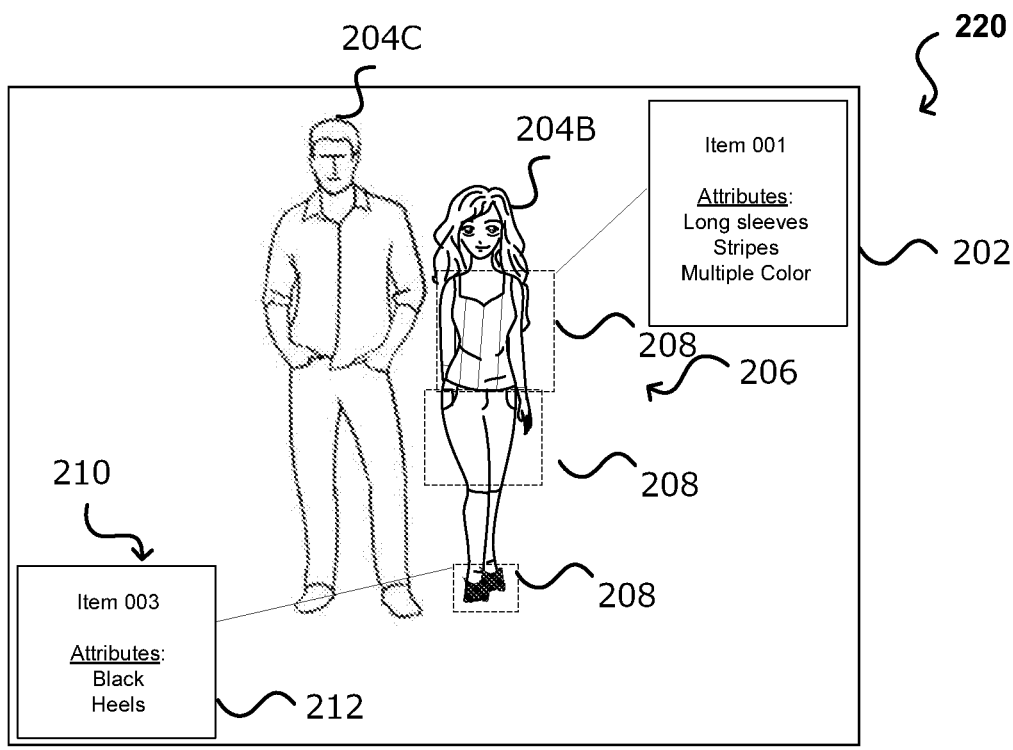
FIG. 2B illustrates an example representation of computer vision techniques for object identification and extraction, in accordance with various embodiments of the present disclosure.

FIG. 2B illustrates an example representation 220 of computer vision techniques for identifying, extracting, and categorizing one or more objects or attributes of objects, in accordance with various embodiments. In the illustrated embodiment, the person 204B is represented again, along with a new person 204C. Accordingly, in various embodiments, the style profile being built may be attributed to the style of the person 204B. As such, object recognition and attribute identification may be limited to person 204B, thereby saving computing resources and better analyzing the style of the person 204B without including objects from different people.

As shown in the illustrated embodiment, the person 204B is wearing apparel items 206 and individual items 208 are recognized (as illustrated by the dashed outlines) and item profile 210 are generated based on one or more image extraction and object recognition techniques, as described above. The apparel items for the person 204C are advantageously not evaluated, thereby saving computing resources and further not adding items to the style profile not associated with the person 204B. The generated style profiles 210 are different than those from FIG. 2A. For example, the person 204B is wearing a long sleeve shirt, rather than a sleeves top. Furthermore, the shoes have changed from boots to heels. Each of these identified individuals items 208 may be utilized to build the style profile. By way of example only, the person 204B mixes solid and patterns in each of FIGS. 2A and 2B. This may be added to the style profile and utilized to recommend items or outfits to users. Moreover, the person 204B mixes sleeve lengths (long sleeve and sleeveless) with pant lengths (short pants and long pants). Again, this stylistic choice may be added to the style profile or otherwise utilized to generate the style profile.

It should be appreciated that, in various embodiments, additional images may include persons wearing the same apparel items which may provide a better view of the item, and therefore provide additional attributes of the item that may have been previously indeterminable from the initial image. These additional attributes are added to the item profile 210 of the item. In some embodiments, one or more attributes of an item previously determined from the initial image may be overridden by respective attribute determined from the additional image. Thus, style profiles may be updated based on additional images. In some embodiments, the process of matching an item in the additional image may include a confirmation from the user. For example, based on the features extracted from the additional image data and/or attributes of the item determined therefrom, one or more candidate items from the style profile may be determined to be potential matches and presented to the user as choices. The user may confirm that a potential match is indeed the item featured in the additional image.

Figure 3:
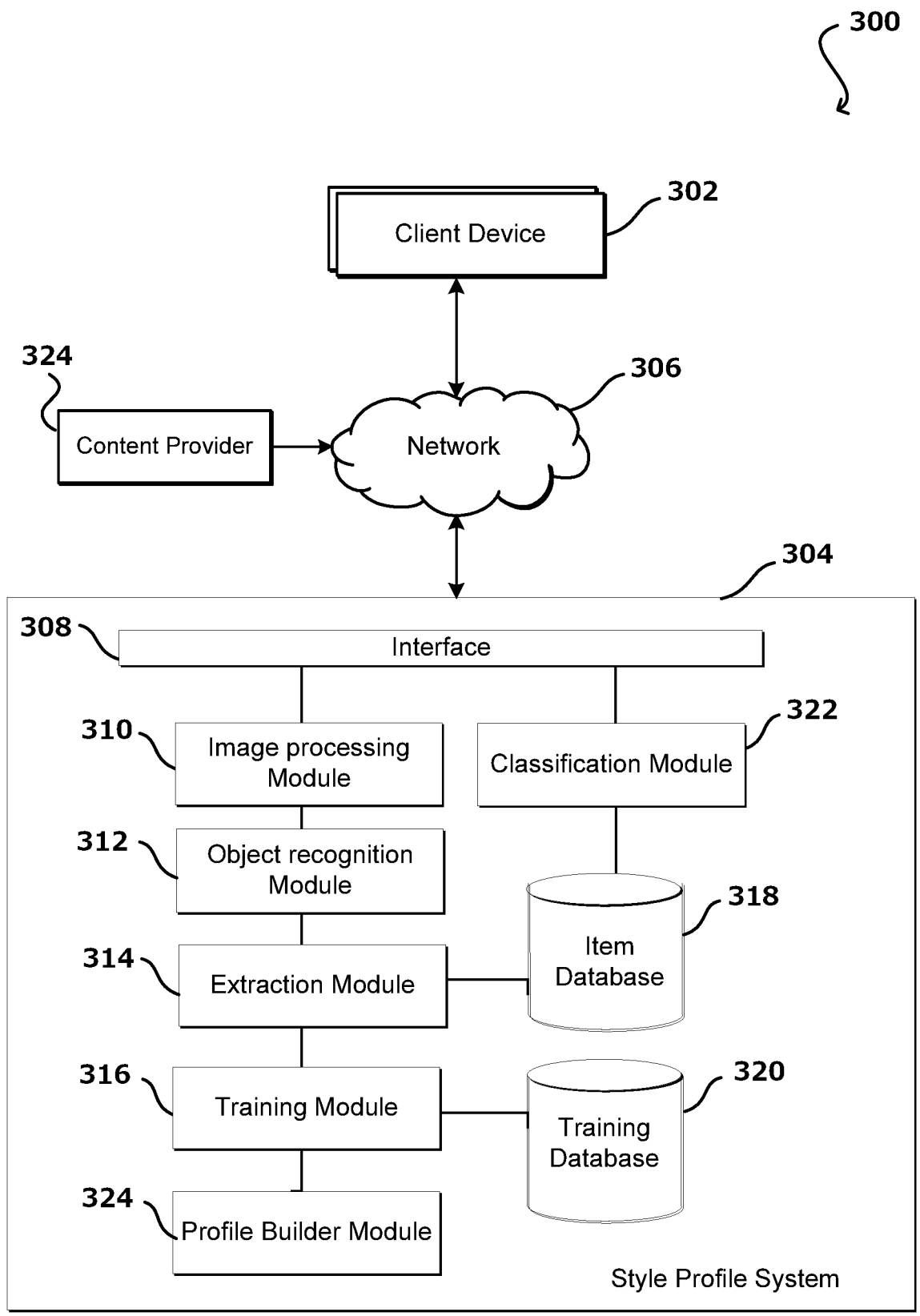
FIG. 3 illustrates an example computing system for computer vision based style profile generation, in accordance with various embodiments of the present disclosure.

FIG. 3 illustrates an example computing system 300 for computer vision based style profiling, in accordance with various embodiments of the present disclosure. In various embodiments, a system 300 may enable a client device 302 to receive content from a style profile system 304. The device client 302 may access a content provider 324, such as an application or other web platform or service to request generation of style profiles or recommendation based on style profiles. In some embodiments, style profile system 304 may be implemented at one or more servers at the content provider 324 or a separate service provider. The client may utilize the style profile system 304 to upload image data to generate or refine style profiles. In some other embodiments, the style profile system 304 may be implemented remote from the content provider 324, such that the content provider 324 provides data to the style profile system 304, the style profile system 304 may either transmit content, such as recommendations back to the content provider 324 or directly to the client device 302.

The client device 302 may represent a client-side computer device that includes any type of computing devices having network connectivity, including personal computers, tablet computers, smart phones, notebook computers, and the like. Multiple client devices 302 may be connected to the style profile system 304 via the network 306, and the style profile system 304 may provide individualized service to each client device 302, such as based on the type of client device. In some embodiments, the client device 302 may be a virtual device, Web program, or software application that can communicate with the style profile system 304 directly or over the network 306, making and receiving requests and calls, and sending and receiving data. The network 306 can include any appropriate network, such as the Internet, a local area network (LAN), a cellular network, an Ethernet, Wi-Fi, Bluetooth, radiofrequency, or other such wired and/or wireless network. The style profile system 304 can include any appropriate resources for performing the various functions described herein, and may include various servers, data stores, and other such components known or used for providing content from across a network (or from the cloud).

In various embodiments, the style profile system 304 may include functional and data aspects illustrated herein as an interface 308, an image processing module 310, an object recognition model 312, an extraction module 314, a training module 316, an item database 318, a training database 320, and a classification module 322. One or more of the modules and databases described above may be implemented jointly or separated further into additional modules. For example, the interface 308 can facilitate communication between the client device 302 and the style profile system 304. Requests received by the style profile system 304 can be received by the interface 308. Example requests may include a request for data regarding information for a style for an item, among others. The interface 308 may also provide outputs from the style profile system 304 to the client 302, such as notifications or other content. The interface 308 may also include components such as specific application programming interfaces (APIs), load balancers, request and/or data routers, and the like. The interface 308 may also facilitate communication with the content provider 302, whether local or remote.

The image processing module 310 may receive images from the client device 302 through the interface 308 and process the images to prepare the images for optimal feature extraction by the object recognition model. Furthermore, the image processing module 310 may also receive images from the content provider 324 and/or from links or other access granted to the image processing module 310. For example, the client device 302 may provide a link to a public social media page for a particular person, which the image processing module 310 may then utilize to crawl through and evaluate various images associated with the social media page. The image processing module may determine regions of the image that pertain to individual objects and separate them for analysis by the object recognition model, among other image processing functions. The object recognition model 312 may include one or more trained machine learning models, such as convolutional neural networks trained to determine various attributes of the items in the image. The extraction module 314 may extract and classify the objects recognized by the object recognition module 312. For example, the extraction module 314 may be utilized to identify and extract certain attributes, such as colors, patterns, clothing types, etc. from the recognized objects.

In various embodiments, the item database 318 may include one or more individual items that may be known to correspond to one or more styles or attributes. For example, in certain embodiments, apparel items may be evaluated and stored within the item database 318 offline and thereafter extracted and the identified objects may be matched with the items in the item database 318, thereby enabling item profiles to be built faster with more information. Additionally, in various embodiments, the item database 318 may store identified objects and/or extracted attributes from the provide image data for later use.

The classification module 322 may, in certain embodiments, be part of the extraction module 314, and be utilized to classify and/or categorize certain objects and/or attributes. For example, the classification module 322 may sort objects into types (e.g., pants, shirts, dresses, shoes, etc.), style, color, pattern, etc. Furthermore, the classification module 322 may provide other types of groupings or collections of items, such as summer apparel, winter apparel, beach wear, formal wear, and the like. In various embodiments, the classification module 322 may further be utilized to recognize patterns or grouping decisions to identify stylistic choices within the image data. For example, the classification module 322 may determine whether certain types of objects or attributes appear together more frequently than others and may, in various embodiments, assign a weight to object-pairs that appear together frequently. As a result, these object-pairs may be weighted as likely belonging to the same style group. Additionally, in various embodiments, the classification module 22 may identify and reconfirm certain attributes based on the data presented to the classification module 22. For example, in an embodiment the input data may include two pieces of input data having items that are seemingly unrelated (e.g., a red dress and a painting of a rose). After analysis and attribute extraction, the classification module 22 may utilize one or more aspects of the attributes of the painting of the rose, such as the red color of the rose, to confirm an important aspect of the dress, namely, the red color. In this manner, additional image data may be utilized to confirm classifications or important attributes for classification.

In various embodiments, the training module 316 may associate data and attributes determined for the same item through different images such that the object recognition module and detect attributes from images providing limited information. The training database 320 may store these associations and other training data. As a result, as additional data is acquired the style profile system 304 may become more robust and accurate at establishing style profiles based on image data.

The illustrated style profile system 304 further includes a profile builder module 324. In various embodiments, the profile builder module 324 may have access to the data and/or results from each of the image processing module 310, object recognition module 312, extraction module 314, classification module 322, item database 318, and/or other information. The profile builder module 324 may collect and/or aggregate the data from the various sources in order to build a profile corresponding to the images and/or text queries from the client device 302. For example, the profile builder module 324 may analyze objects and attributes extracted from various images of a particular celebrity to build a style profile indicative of that celebrity, which may include most worn brands, stylistic choices (e.g., patterns, colors, etc.), clothing types, and the like. Furthermore, the profile builder module 324 may evaluate various images from certain situations or events (e.g., weddings, business meetings, awards shows, etc.) to build style profiles for those events.

Figure 4:
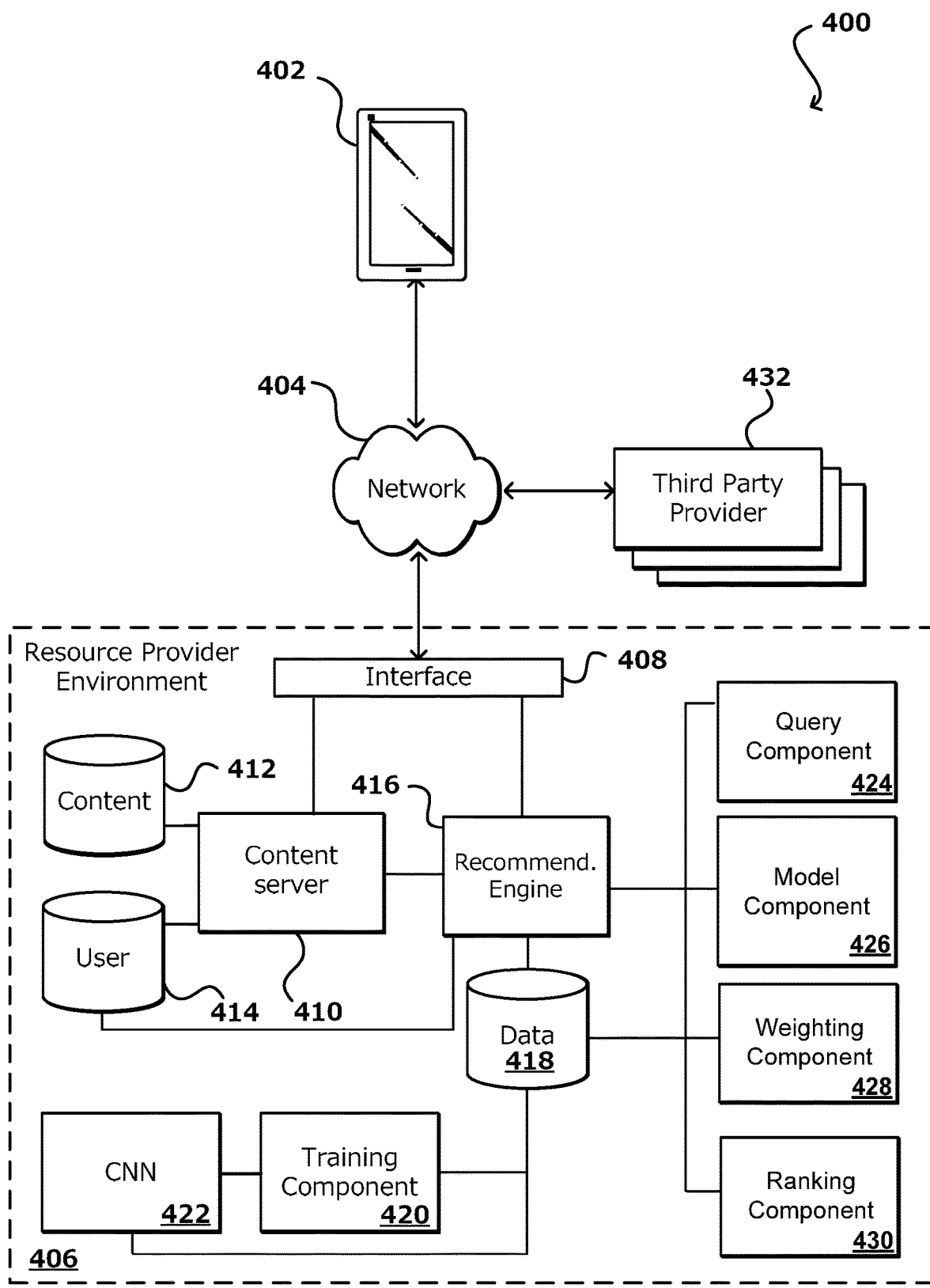
FIG. 4 illustrates an example environment in which aspects of the various embodiments can be implemented, in accordance with various embodiments of the present disclosure.

FIG. 4 illustrates an example environment 400 in which aspects of the various embodiments can be implemented. Specifically, the example environment 400 includes a recommendation engine that can make recommendations based on one or more style profiles, such as a generated style profile. The recommendations may further be based on a query from the user, such as a request for "something like that" accompanied by image data or a query indicative of an upcoming event, such as "something for a beach wedding." The recommendations may include suggested items for purchase and may further be presented along with a compelling browsing experience to enable the user to look through a collection of items to place their own stylistic preferences or choices onto the presented style profile.

In this example, a computing device 402 is able to make a call or request across one or more networks 404 to a content provider environment 406. The network(s) can include any appropriate network, such as the Internet, a local area network (LAN), a cellular network, an Ethernet, or other such wired and/or wireless network. The content provider environment 406 can include any appropriate resources for providing content from a resource provider, as may include various servers, data stores, and other such components known or used for providing content from across a network (or from the "cloud"). In this example, a request received to the content provider environment 406 can be received by an interface layer 408 of the environment 406.

As known for network environments, the interface layer can include components such as interfaces (e.g., APIs), load balancers, request and/or data routers, and the like. If the request is a request for content, such as for content for a page to be displayed in an application, information for the request can be directed to one or more content managers 410 and/or content servers, which can obtain the content from a content data store 414 or other such repository to be sent back across the network(s) to the computing device. In some embodiments, information for the request might also be compared against user data in a user data store 412 or other such location do determine, for example, whether the user has access rights to that content or whether the content is somehow associated with the user. In some embodiments user data might also be analyzed to determine which type of content to provide additional supplemental content to provide with the primary content, and the like. In various embodiments, recommendations may be determined by a recommendation engine 416 and provider by the content server 410 based upon data stored in the data repository 418 or determined using a query component 424 or model component 426, among other such options. In some embodiments the recommendation engine 416 may access a weighting component 428 or other such mechanism to weigh the data, such as various components of training data, in determining the recommendations. Furthermore, a ranking component 430 may be utilized to determine an ordering in which to present the recommended items.

A recommended item, or plurality of recommended items, from the catalog of items may be determined based at least in part on the recommendation engine 416 utilizing one or more style profiles. The ordering or ranking of the item or items selected for recommending to the target user may be determined based on various item selection/recommendation techniques. For example, the item may be selected based on a popularity ranking of items with respect other items within the style profile, other items for sale through an online marketplace, or the like. In some embodiments, a plurality of items may be presented and this plurality of items may be relatively similar to or diverse from each other. A simple popularity based ranking may be used in some embodiments and/or for some categories, while other techniques such as brand-specific rankings might be more relevant in others. In some embodiments, business considerations, such as anticipated revenue from sales, revenue from sponsored content, revenue from presenting products, or the like. Furthermore, in various embodiments, rankings may be determined on anticipated or expected conversion rates for items, for example, based on previous purchase history, browsing history, and the like.

In various embodiments, determining the recommendation may include ranking various actions content items in which all or a subset of the plurality of content items are assigned a match score indicating how well matched (i.e., strongly associated) the respective content is with respect to user or account. A recommended action or content item may be one whose match score is higher than a threshold score or ranked within a certain number of positions. The individual match scores can be determined at least in part using neural networks 422 such as a CNN through training on an appropriate data set. The training component 420 can perform the training on the models and provide the resulting results and/or trained models for use in determining the individual match scores or the recommended products. The training component 420 can be the same system or service that is used to train a localizer, as well as various face detectors or other models, networks, or algorithms discussed or suggested herein.

In the example shown in FIG. 4, a neural network 422 such as a convolutional neural network (CNN) can be trained using, for example, training images of various apparel items presented in different circumstances or with different persons. As mentioned, for CNN-based approaches there can be pairs of images submitted that are classified by a type of attribute (e.g., an association with a certain product), while for GAN-based approaches a series of images may be submitted for training that may include metadata or other information useful in classifying one or more aspects of each image. For example, a CNN may be trained to perform object recognition using images of different types of objects, and then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. According to some embodiments, training data and respective can be located in a data store 418. A training component 420 can utilize the training data set to train the neural network 422.

As further described, neural networks can include several learning layers in their architecture. A query image from the training data set is analyzed using the neural network to extract a feature vector from the network before the classification layer. This feature vector describes the content of the training data. This process can be implemented for each piece of training data in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities. The initial query image in some embodiments may be received from client device 402 over network 404 and processed by query component 424. In some embodiments, the query image can be received when a selection of an image from a third party provider 432 or content provider environment 406 is selected, such as through the selection of a content item. When a query image is received, for example, a set of query object descriptors may be obtained or determined for the query image. For example, the query may be associated with an existing style profile or a request to establish a new style profile may be provided to the user.

Additionally, the query image can be analyzed to determine local feature descriptors for the query image. Using the clustered feature vectors and corresponding visual words determined for the training images, a histogram for the query image can be determined. The query image can also be analyzed using the neural network 422 to extract a feature vector from the network before the classification layer. This feature vector describes the subject and/or objects shown in the image. Using the local feature descriptors and object feature descriptors, visually similar images (i.e., image data representing facial features of various other uses) and their values of associations with one or more products in content provider environment 406 can be identified.

Figure 5:
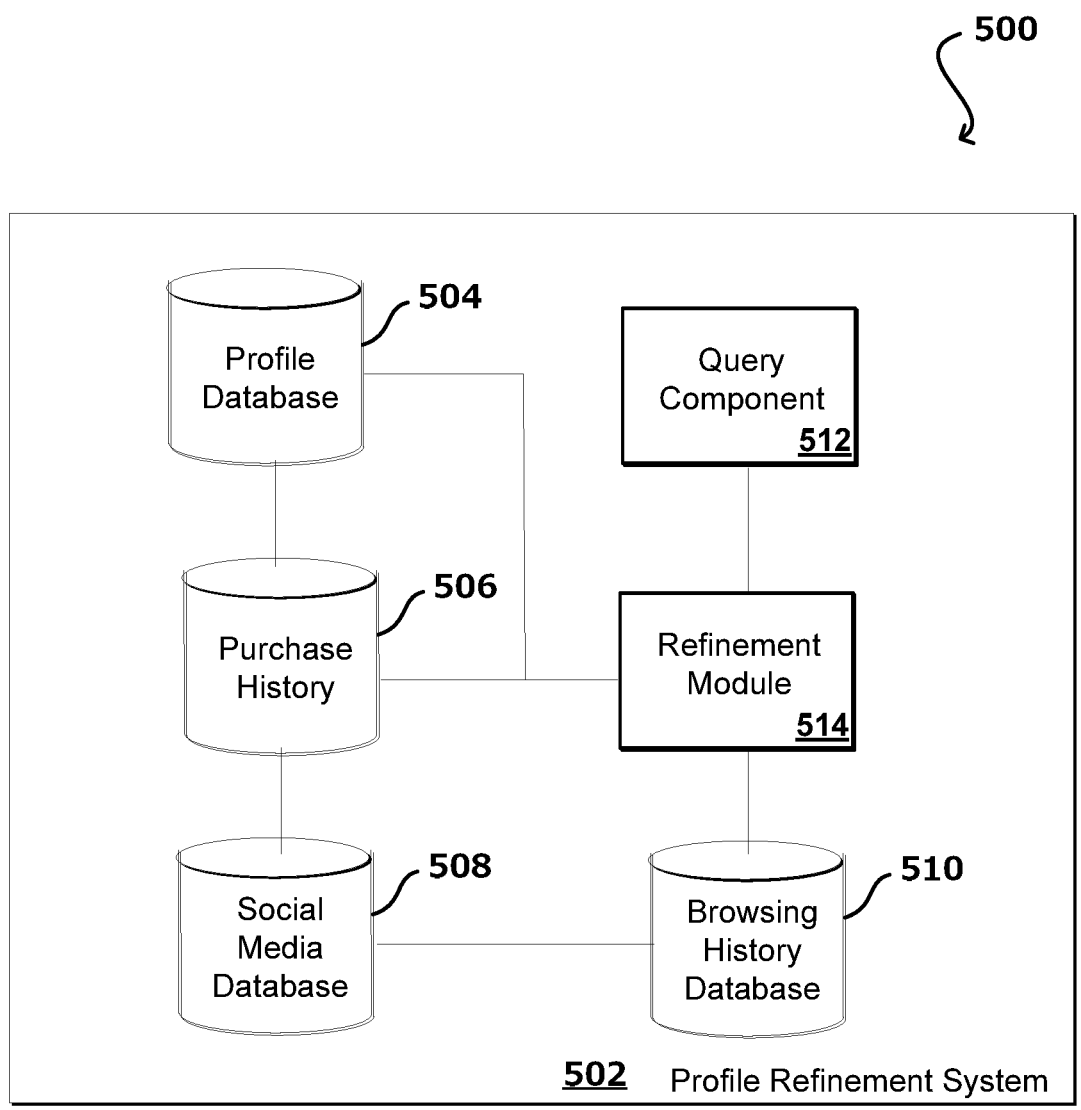
FIG. 5 illustrates an example computing system for computer vision based style profile refinement, in accordance with various embodiments of the present disclosure.

FIG. 5 illustrates an example environment 500 for generating and updating a style profile, in accordance with various embodiments. It should be appreciated that various items described herein may be incorporated into the style profile system 306, described in FIG. 3, or may be separate components accessed by other means, such as a network. The illustrated environment 500 includes a profile refinement system 502 for adjusting and/or changing various aspects of a style profile. As will be described, changes to the style profile may be driven by various different inputs, such as a user query, purchase histories, social media, browsing history, and the like. The illustrated embodiment includes a profile database 504, which may include a plurality of different style profiles. These style profiles may be associated with a particular user (e.g., a user-curated profile, a profile generated by user queries, etc.) or may be a pre-determined style profile (e.g., a profile generated by a service provider). Moreover, it should be appreciated that a pre-determined style profile may become a profile associated with a particular user once interacted with via a user logged into a user account. The illustrated profile refinement system 502 further includes a purchase history database 506, social media database 508, and browsing history database 510. In various embodiments, purchases made by the user may be analyzed for making adjustments to one or more profiles. For example, particular sizes purchases by the users and their corresponding fits may be utilized to adjust one or more profiles. Additionally, different brands, colors, etc. may also be used to adjustment style profiles.

Furthermore, in various embodiments, the social media database 508 may be used to extract information for further refinements. For example, the user may indicate that a style profile is indicative of a style of a certain celebrity or social media influencer. The user may link a public account, via the social media database 508, and thereafter updates may be evaluated and used to refine the style profile. For example, new photographs or videos added to the account may be analyzed and different objects or attributes may be extracted and used to generate or modify different style profiles. Additionally, in various embodiments, the browsing history database 510 may be used to determine different stylistic preferences based on the user's browsing patterns. For example, the user may have a brand website that the user frequently visits or particular favored online marketplaces. The profile refinement system 502 may use this information to obtain additional data to further fine the style profiles.

In various embodiments, profile refinement system 502 further includes the query component 512. The query component 512 may receive image files (e.g., photographs, video, etc.) or text queries to further refine the various style profiles. Moreover, in various embodiments, the query component 512 may be used to receive a query indicative of a particular style profile for refinement. For example, the user may submit a query to "add this to 'my favorite styles'" along with image data. The query component 512 may transmit the request to the refinement module 514, which may acquire the style profile from the profile database 504, along with various other information from the other above-described databases. Furthermore, in various embodiments, the refinement module 514 may be communicatively coupled to the style profile system 304 to enable further analysis of the image data submitted via the query component 512. In this manner, adjustments to the style profiles may be made and saved to the profile database 504.

Figure 6:
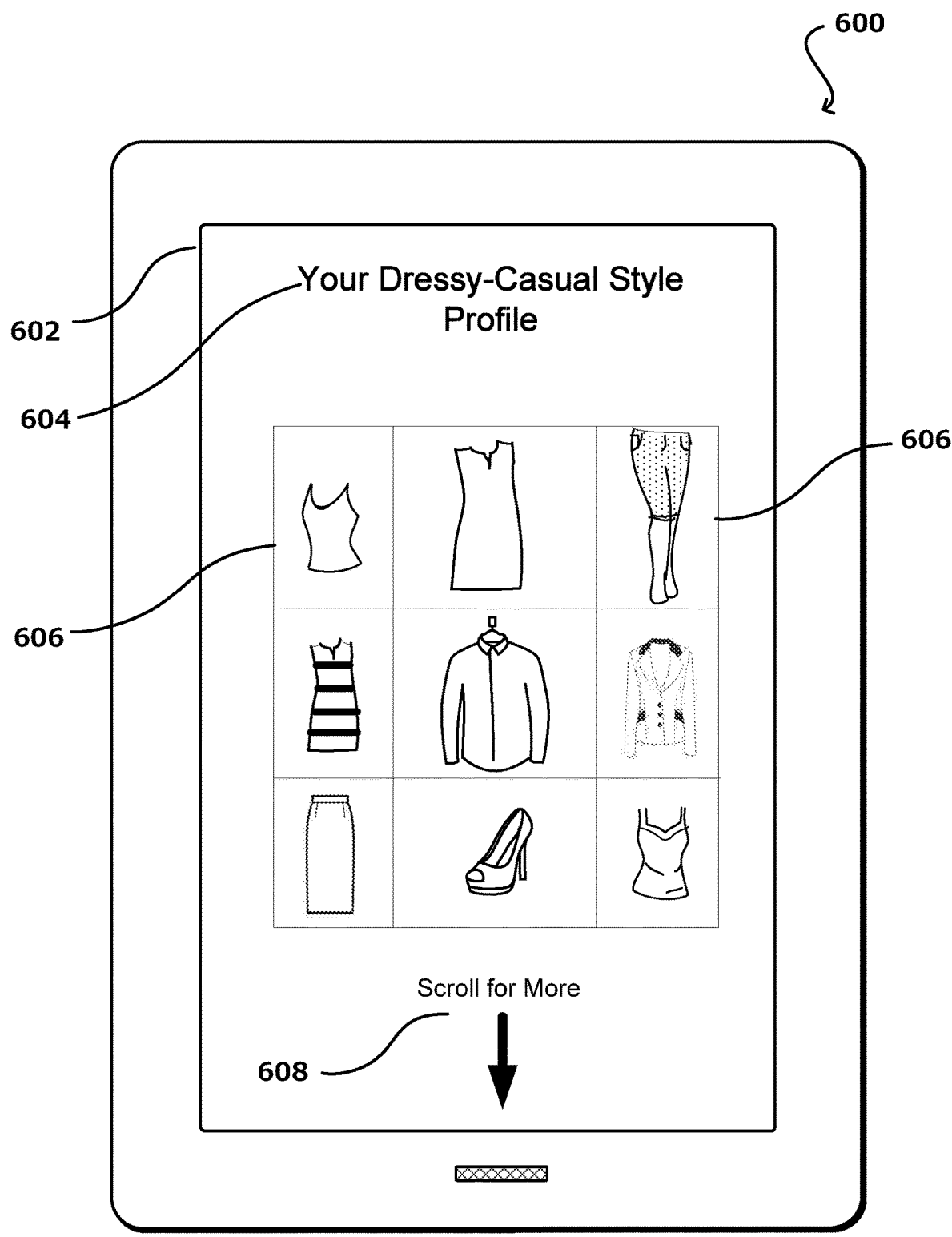
FIG. 6 illustrates an example representation of computer vision based style profile recommendations, in accordance with various embodiments of the present disclosure.

FIG. 6 illustrates an example interface 600 that may present various items to a user, for example via a computer device, based on one or more style profiles. The screen 602 of the electronic device includes a title 604 identifying the corresponding style profile for the interface 600. The illustrated embodiment includes a "Dressy-Casual" style profile and may include items that may be worn to a nice dinner or evening out. As noted above, these items may be selected using one or more of the above-described modules for extracting objects or attributes from image files and then correlating the objects or attributes with one another to determine the style profile based on events, corresponding person with that style, or the like. The illustrated interface 600 is arranged in a tile or card layout with the items 606 positioned proximate one another. In various embodiments, the user may select one of the items 606 and be taken to a product detail page, which may include other items like the selected item or provide an option to buy the item. It should be appreciated that the tile layout is for illustrative purposes only and that other layouts may also be used. The illustrated interface 600 further includes an infinite scroll 608, which may enable the user to continue to scroll down to see more selections. Additionally, while the illustrated embodiment includes a variety of different items 606, it should be appreciated that the items 606 may be filtered or categorized to enable the user to identify specific items. For example, rather than showing dresses and shoes, the user may select to show only dresses. In this manner, items 606 within the style profile may be presented to the user for review.

It should be appreciated that while the embodiment illustrated in FIG. 6 corresponds to apparel items that other items may also be utilized within the scope of the present disclosure. For example, an interior design style may correspond to future or decorations within a room or home. The user may present images from catalogs of desirable styles and, upon analysis, a style profile associated with interior decorations may be generated. Furthermore, other types of items such as gadgets (e.g., electronics owned by certain bloggers or influencers, electronics or tools for particular hobbies, etc.), media (e.g., books, movies, television programs, magazines, music, etc.) and the like may also be used to develop style profiles.

Figure 7:
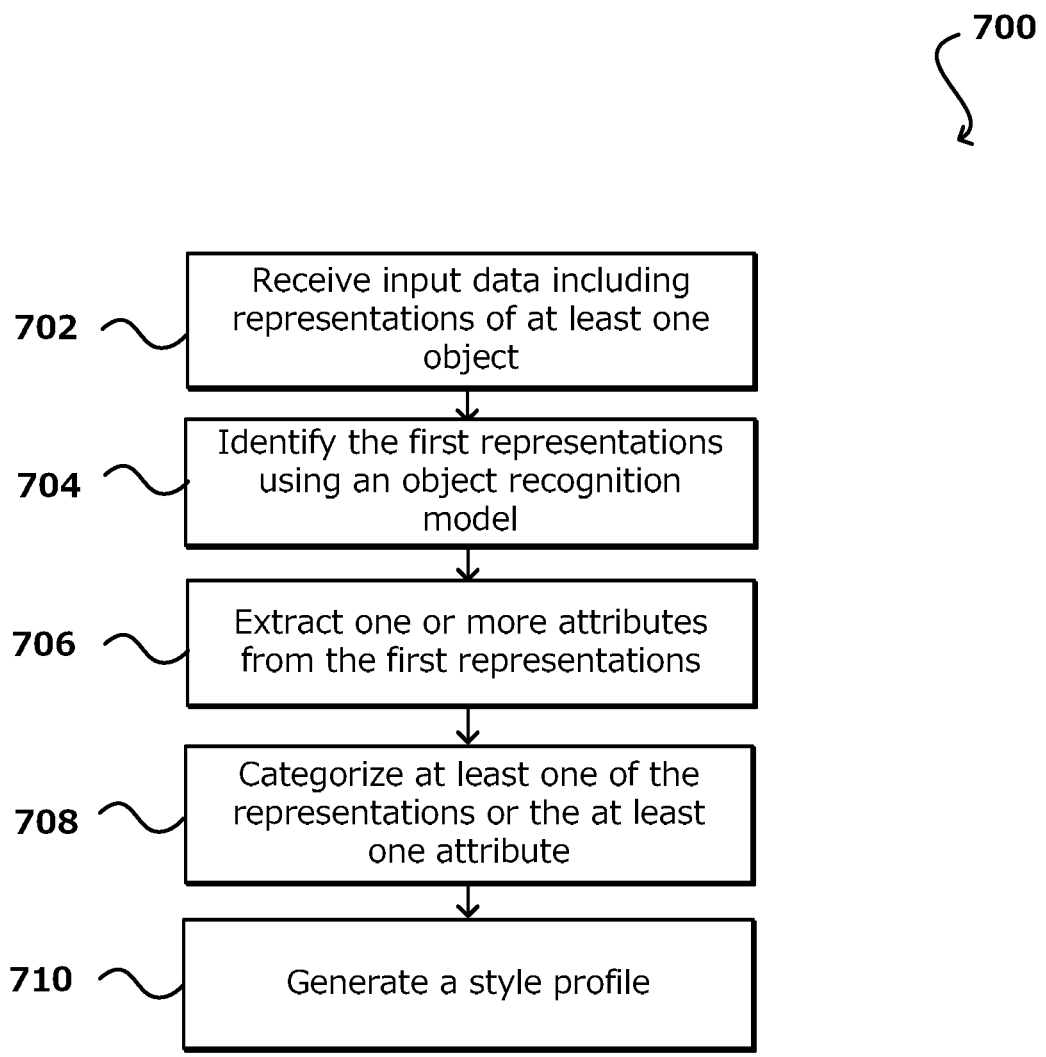
FIG. 7 illustrates an example process of generating style profiles based on image data, in accordance with various embodiments of the present disclosure.

FIG. 7 illustrates an example process 700 of generating a style profile based on received image data, in accordance with various embodiments. It should be understood that, for any process discussed herein, there can be additional, fewer, or alternative steps performed in similar or alternative orders, or in parallel, within the scope of the various embodiments. In this example, input data is received 702, which includes representations of at least one object, such as an apparel item. In various embodiments, the input data may be image data. As described above, in various embodiments the image data may not correspond to a photograph or video, and rather, may include text data, auditory data, or the like. The at least one object is identified 704, for example using an object recognition model described above. Furthermore, in various embodiments, object identification may be performed using optical character recognition, natural language processing techniques, or the like. The process further includes extracting one or more attributes from the identified at least one object 706. For example, as described above, the one or more attributes may correspond to a style, a color, a pattern, a fit type, or the like. The at least one object is categorized based on at least one of the identification or the at least one attribute 708. In certain embodiments, both may be used. For example, an object may be categorized as "winter wear" when a heavy coat is identified and also as "slim fit" or "formal" based on a style of the heavy coat. Furthermore, in various embodiments, attributes may be categorized based on their association with other items or attributes within various style profiles. Based on the categorization, a style profile may be generated 710. The style profile may correspond to a variety of different factors, such as identified event associated with the object and/or attributes, a person wearing the apparel item, or the like.

Figure 8:
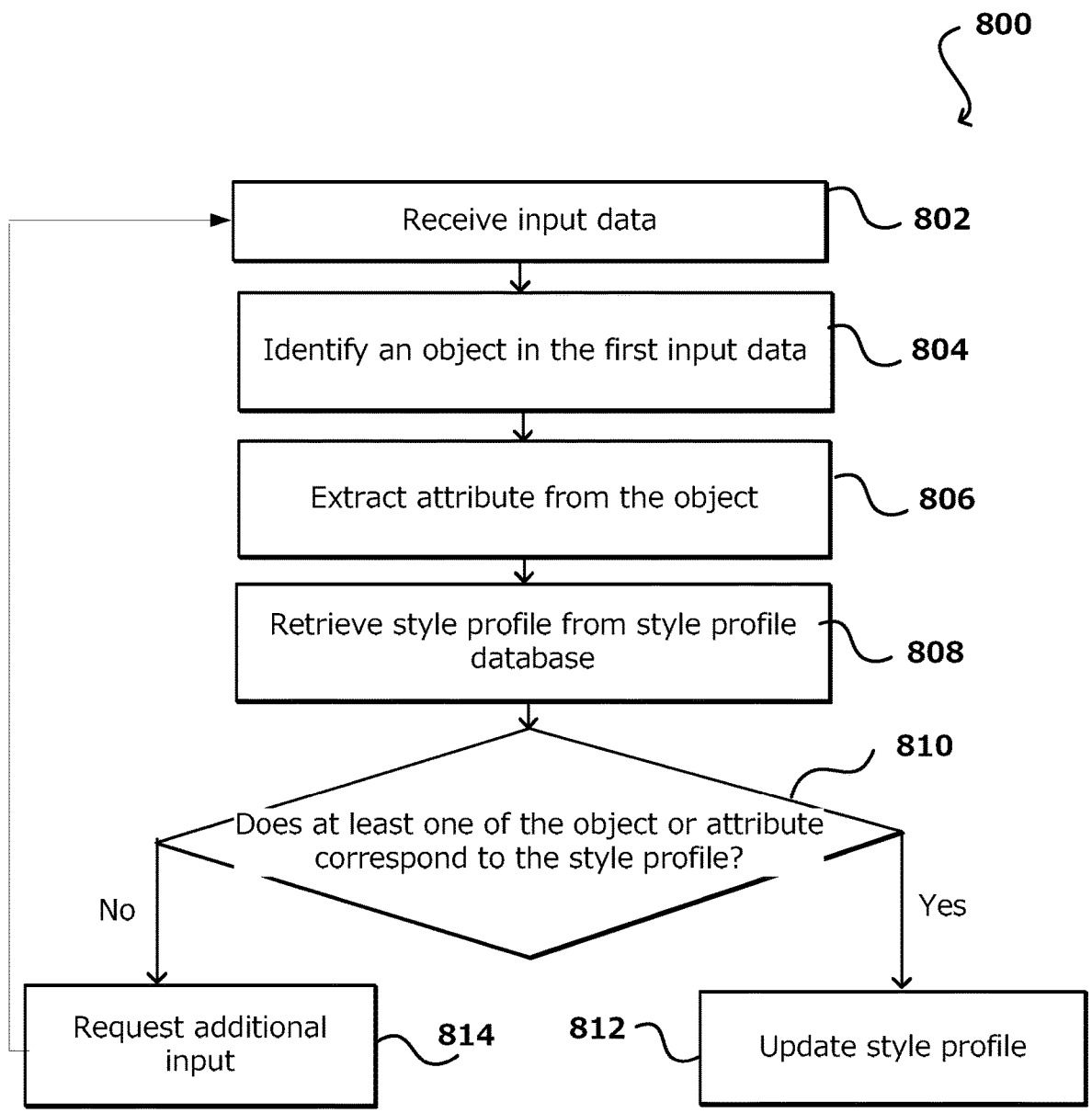
FIG. 8 illustrates an example process for updating computer vision based style profiles, in accordance with various embodiments of the present disclosure.

FIG. 8 illustrates an example process 800 for updating a style profile based on received image data, and in certain embodiments, user input. In this example, input data, such as image data, text data, voice data, or the like, is received 802, which includes representations of at least one object, such as an apparel item. For example, as described above, the input data may be a photograph of a celebrity wearing one or more apparel items that a user enjoys or otherwise would like to purchase. Moreover, in various embodiments, the input data may be from a social media page or brand catalog, for example, to identify or generate style profiles for different events, seasons, or the like. The at least one object is identified 804, for example using an object recognition model described above. Furthermore, in various embodiments, the user may identify, at least in part, certain desirable objects from the image data. For example, the user may highlight or otherwise identify certain items in the image data. The process further includes extracting one or more attributes from the identified object 806. Extraction of the attribute may correspond to a variety of properties of the identified object, such as a type of object (e.g., shirt, skirt, pants, footwear, jewelry, handbags, etc.), a color, a pattern, a material type (e.g., cotton, leather, linen, cashmere, silk, etc.), a fit (e.g., baggy, tight), or any other reasonable property.

In various embodiments, the input data may be utilized to update or refine an existing style profile. The style profile may be associated with a particular user or may be a general style profile, for example one curated by a content provider, that is being updated with a new trend, for a new season, or the like. Furthermore, in various embodiments, the curated style profile may be updated to be particularly associated with a registered user. For example, in various embodiments, the user may sign up for curated delivery of apparel items corresponding to a particular style profile. As the user provides feedback or inspirations (e.g., image data), the user's curated style profile may be continuously updated. A style profile is retrieved 808, for example from the style profile database. In certain embodiments, the style profile may be pre-selected. For example, the user may provide input indicative of which style profile will be updated. However, in various embodiments, one or more style profiles may be evaluated in view of the image data to determine which style profile to update. For example, if the image data contains formal wear, a style profile associated with casual clothing is unlikely to be updated based on the image data. However, a style profile associated with weddings may be updated based on the image data. Accordingly, in certain embodiments, the content of the style profile, for example attributes or objects associated with style profiles, may be evaluated, based at least in part on the object or attributes from the image data, to determine which style profile to update 810. If the object or attribute does correspond to the style profile, the style profile is updated 812. However, if the object or attribute does not correspond to the style profile, additional input may be requested 814. For example, as described above, the additional input may correspond to identification of a particular style profile to update based on the image data. In this manner, multiple sets of image data may be evaluated and used to update style profiles.

Figure 9:
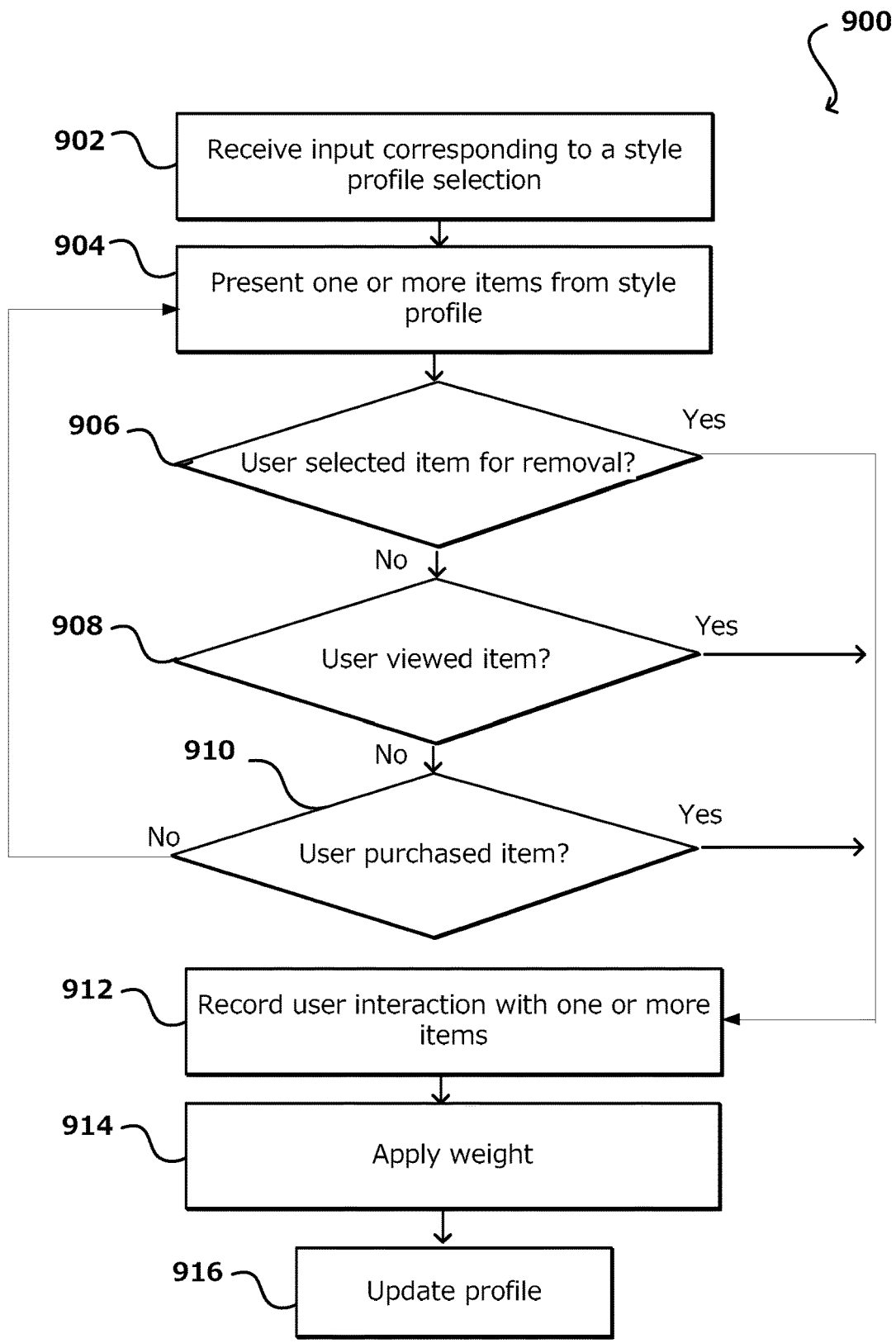
FIG. 9 illustrates an example process for updating computer vision based style profiles based on user interaction, in accordance with various embodiments of the present disclosure.

FIG. 9 illustrates an example process 900 for updating a style profile based on user interaction. In this example, an input is received 902, which may correlate to a selection of a style profile. For example, in various embodiments, a user may log into an account associated with a content provider and select one or more style profiles to view, for example in order to view items for purchase. The content provider may present one or more items from the style profile 904. In various embodiments, the one or more items are presented in a list or tile view such that the user can view multiple items at once. Furthermore, in various embodiments, the one or more items may be filtered, such as by category or type. For example, in embodiments where the one or more items relate to apparel items, the filters may include types of apparel (e.g., shirts, pants, dresses, shoes, etc.). Thereafter, actions the user undertakes while viewing the one or more items may be utilized for updating the style profile to correspond to preferences of the user.

In various embodiments, it is determined whether the user selects an item for removal 906. For example, the user may determine one or more items are not associated with their preferred style, for any number of reasons, and elect to have the item removed from the style profile. In various embodiments, feedback may be requested to indicate why the removal occurred. A non-limiting list of potential reasons includes non-preferred brand, dislike of style, dislike of material, and the like. If the item is selected for removal, such behavior can be recorded 912. If not, it may be determined whether the user selects an item for viewing 908. For example, the user may interact with the item and be presented with a detail page including additional information about the item. If the item is selected for viewing, the behavior can be recorded 912. If not, it may be determined whether the user purchased an item 912. If the item is purchased, the behavior can be recorded 912. If not, then additional items may be presented to the user.

In various embodiments, recording the user's interaction with the items may be integrated into evaluating browsing or purchase history, as described above. Moreover, in various embodiments, interactions may be crowd sourced to update various content provider created profiles. For example, interactions from a plurality of users may drive modifications or updates to the style profiles. It should be appreciated that interaction with the items of the style profile may be correlated to the user's satisfaction with the style profile. For example, frequently purchasing items associated with the style profile may provide an indication that the style profile is providing suggestions that the user likes. However, infrequent purchases or views may be indicative of a style profile that does not provide suggestions that the user likes. But, it should be appreciated that other reasons may exist for why a user does not view of purchase items in a style profile. For example, the style profile may correspond to infrequent events (e.g., formal wear, beach weddings, etc.).

In various embodiments, weights may be applied to certain items and/or attributes of those items 914, based at least in part on the interaction of the user. For example, the weights may lead to more of a certain type of brand or style of apparel item being associated with a particular style profile. Moreover, these weights may be incorporated into other profiles for the user as well. For example, if the user consistently buys Brand A apparel items, it may be likely that Brand A is a particularly favorable brand for the user, and as a result, other style profiles may include more items from Brand A in order to present improved recommendations to the user. Furthermore, particular attributes such as colors, patterns, clothing type (e.g., footwear styles, skirts over other bottom wear, etc.) may also receive weights in order to improve recommendations. It should be appreciated that the weights may not always be positive, as items that are frequently removed or not removed may receive negative or lower weights (e.g., fractions) that may reduce the likelihood the item is recommended. Accordingly, higher weighted items may be presented more frequently and/or be presented across more style profiles. Style profiles may be updated 916 in order to capture the user interactions and provide improved recommendations.

Figure 10:
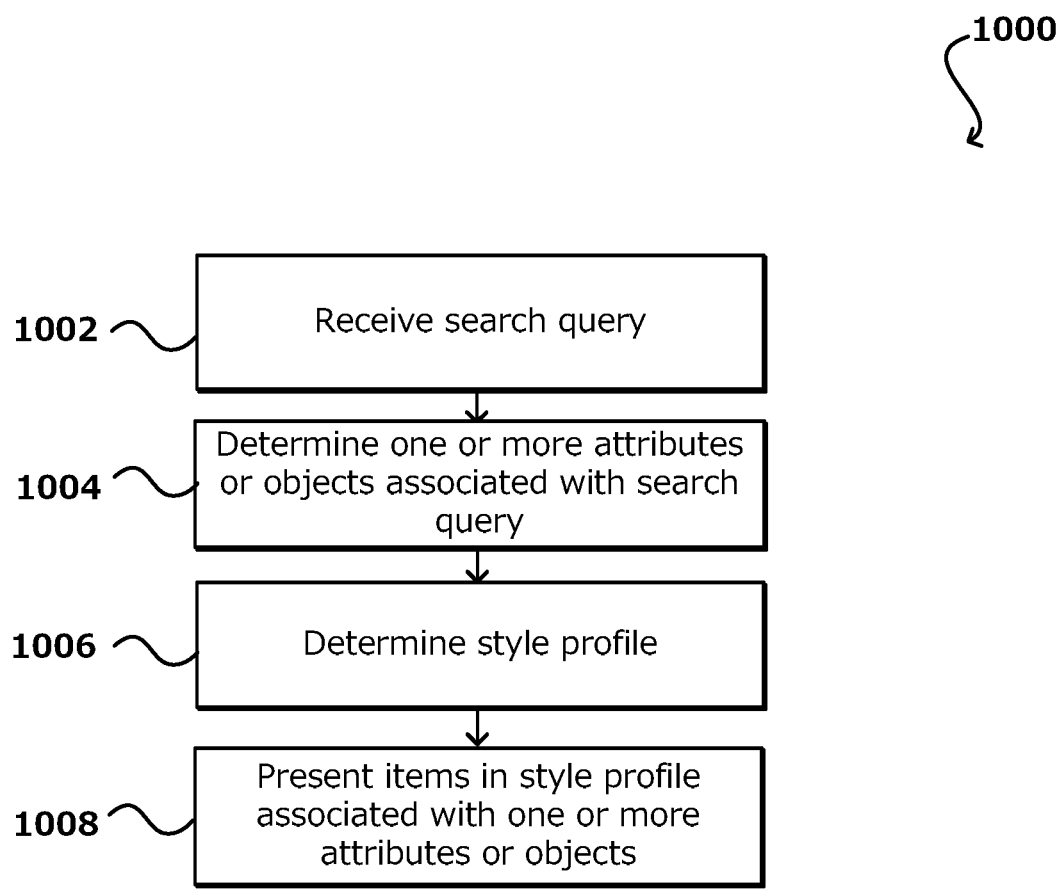
FIG. 10 illustrates an example process for providing recommendations based on a computer vision generated style profile, in accordance with various embodiments of the present disclosure.

FIG. 10 illustrates an example process 1000 for providing recommended products based on a search query. In this example, a search query is received 1002. The search query may be indicative of a particular event (e.g., beach wedding) or a particular style or desired style (e.g., "style like Celebrity A"). The search query may be processed to determine whether one or more attributes or objects may be associated with the search query 1004. For example, in the first example, the term "beach wedding" may correspond to a variety of attributes or objects, because "wedding" may be a particular type of style profile and "beach" may also correspond to a particular profile. Moreover, in various embodiments, predetermined style profiles may include a variety of tags or words associated with the style profiles. Based at least in part on the search query, a style profile may be determined 1006. The style profile may be from user-specific style profiles (e.g., user created, user modified, etc.) or predetermined style profiles (e.g., curated profiles, brand profiles, etc.). Upon determining an appropriate style profile, one or more items in the style profile may be presented to the user 1008. For example, the search query "beach wedding" may lead to showing items approach for beach weddings, such as light colors, linen materials, and the like. In this manner, the search query may be used to determine an appropriate style profile for providing recommendations.

Figure 11:
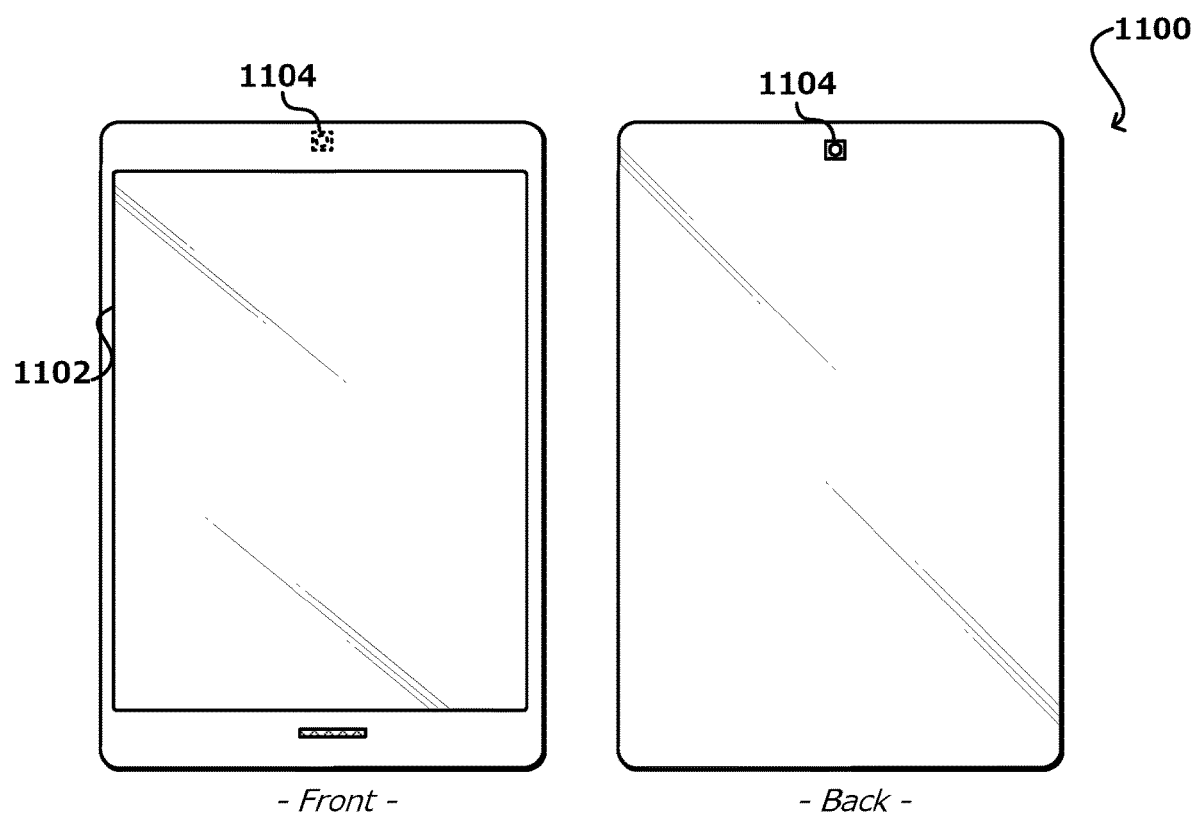
FIG. 11 illustrates an example computing device that can be used, in accordance with various embodiments of the present disclosure.

FIG. 11 illustrates an example computing device 1100 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others. In this example, the computing device 1100 has a display screen 1102, which under normal operation will display information to a user facing the display screen (e.g., on the same side of the computing device as the display screen). The computing device in this example can include one or more media capture elements, in this example including one image capture element 1104 on the back side of the device, although it should be understood that image capture elements could also, or alternatively, be placed on the sides or corners of the device, and that there can be any appropriate number of capture elements of similar or different types. Each image capture element 1104 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 12:
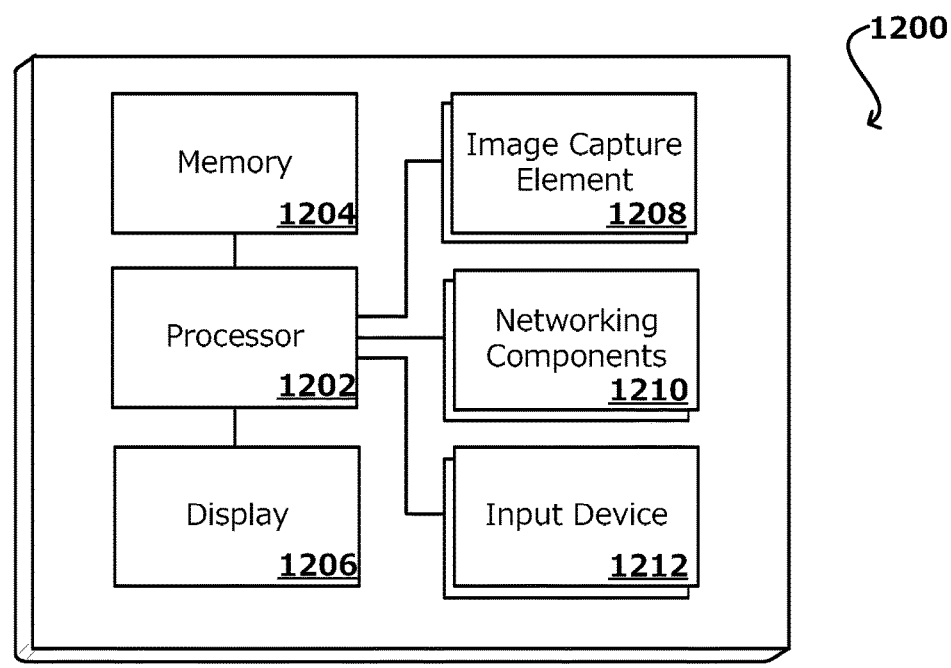
FIG. 12 illustrates a set of example components of one or more devices of the present disclosure, in accordance with various embodiments of the present disclosure.

FIG. 12 illustrates a set of example components of one or more devices 1200 of the present disclosure. In this example, the device includes at least one processor 1202 for executing instructions that can be stored in a memory device or element 1204. As would be apparent to one of ordinary skill in the art, the device can include many types of memory, data storage or computer-readable media, such as a first data storage for program instructions for execution by the processor 1202, the same or separate storage can be used for images or data, a removable memory can be available for sharing information with other devices, and any number of communication approaches can be available for sharing with other devices. The device typically will include some type of display element 1206, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1208, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1210 enabling the device to communicate with remote systems or services such as content providers and rights determining systems. These components can include, for example, wired or wireless communication components operable to communicate over a network such as a cellular network, local area network, or the Internet. The device can also include at least one additional input device 1212 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 13:
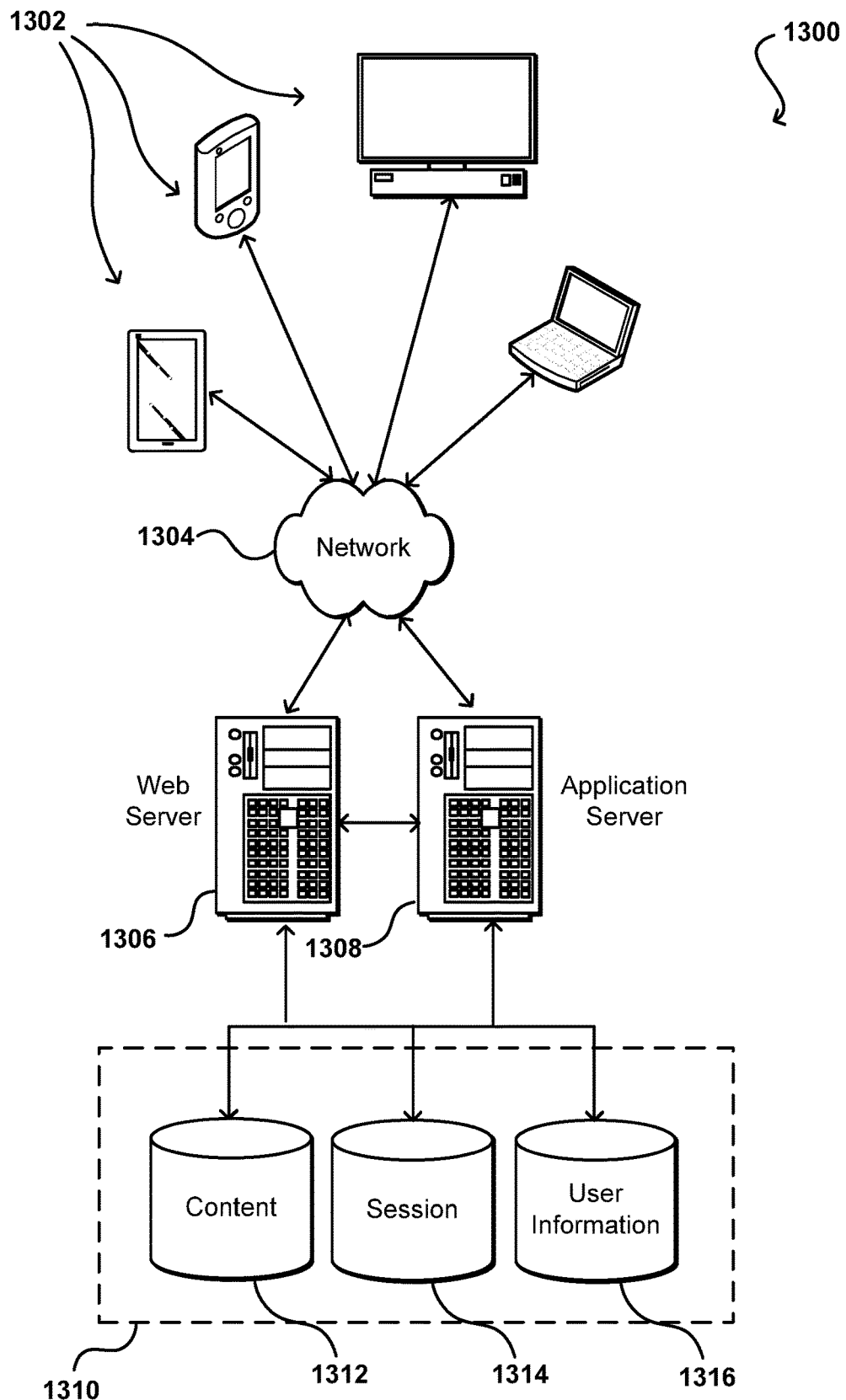
FIG. 13 illustrates an example environment for implementing aspects, in accordance with various embodiments of the present disclosure.

FIG. 13 illustrates an example environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate.

Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
      train a machine learning model to determine a category of respective objects based at least in part on an association between a first attribute and a second attribute corresponding to objects extracted from image data;
      receive first image data including a representation of at least one first object;
      analyze the first image data to detect the representation of the at least one first object;
      determine the first attribute of the at least one first object;
      determine, using the trained machine learning model, the category for the at least one first object, based at least in part on the first attribute;
      generate a style profile, based at least in part on the at least one first object, the determined category, or the first attribute;
      receive second image data including a second representation of at least one second object;
      analyze the second representation to detect the representation of the at least one second object;
      determine the second attribute for the at least one second object;
      determine the second attribute corresponds to the first attribute;
      update the generated style profile to include at least one of the at least one second object or the second attribute;
      generate a first item profile for the at least one first object, the first item profile including the first attribute;

generate a second item profile for the at least one second object, the second item profile including the second attribute; and
store the first item profile and the second item profile.

2. The system of claim 1, wherein the first attribute or the second attribute include at least one of an item type, an item style, a size, a texture, a material, or a brand.

3. The system of claim 1, wherein the instructions when executed further cause the system to:
receive a query corresponding to a request for an item within the updated generated style profile; and
provide the item, the item having a third attribute corresponding to at least one style profile attribute.

4. A computer-implemented method, comprising:
training a machine learning model to determine a respective category of a respective item based at least in part on an association between a respective first attribute and a respective second attribute corresponding to items extracted from similar image data;
receiving image data including representations of a plurality of items;
determining the respective attributes for the plurality of items, the respective attributes being extracted from the image data and corresponding to features of the plurality of items;
determining correlations between the plurality of items, based at least in part on the respective determined attributes;
determining, using the trained machine learning model, the respective category for each item of the plurality of items, based at least in part on the respective correlations;
generating a style profile for related items of the plurality of items, the related items including at least one of items within the same category or items sharing at least one attribute; and
providing, for display, representations of items associated with the style profile, the representations of items being different from and including more items than the plurality of items.

5. The method of claim 4, further comprising:
analyzing the image data to identify the representations of the plurality of items from the image data; and
analyzing the representations using one or more object recognition models to determine the respective attributes.

6. The method of claim 4, further comprising:
receiving second image data including second representations of a second plurality of items;
determining respective second attributes for the second plurality of items;
determining the category for each item of the second plurality of items, based at least in part on the respective determined second attributes; and
updating the style profile, based at least in part on the determined second attributes of the second plurality of items.

7. The method of claim 4, further comprising:
receiving a query corresponding to a request for an item for sale in an online marketplace;
determining at least one query attributes associated with the query;
analyzing the style profile for corresponding attributes to the query;
matching at least one attribute of the style profile with at least one query attribute; and
providing the item for review.

8. The method of claim 4, further comprising:
providing a plurality of items associated with the style profile;
determining an interaction with an item of the plurality of items, the interaction including at least one of a request to remove the item, a request to view the item, or purchasing the item.

9. The method of claim 8, further comprising:
updating the style profile, based at least in part on the interaction with the item of the plurality of items.

10. The method of claim 9, wherein the attributes include at least one of an item type, an item style, a size, a texture, a material, or a brand.

11. The method of claim 4, further comprising:
receiving access to social media data, the social media data providing second image data;
updating the style profile based on the image data from the social media data; and
checking the social media data for new image data.

12. The method of claim 4, further comprising:
receiving a selection corresponding to a selected item of the plurality of items;
determining the attributes of the selected item; and
updating the style profile based on the attributes of the selected item.

13. The method of claim 4, further comprising:
receiving second image data including second representations of a second plurality of items, the second image data including a representation of a person also in the first image data;
determining respective second attributes for the second plurality of items;
receiving third image data including third representations of a third plurality of items, the third image data including a representation of the person also in the first image data and the second image data;
determine respective third attributes for the third plurality of items;
updating the style profile, based at least in part on the second attributes and the third attributes; and
correlating the style profile to the person.

14. A system, comprising:
at least one computing device processor; and
a memory device including instructions that, when executed by the at least one computing device processor, cause the system to:
train a machine learning model to determine a respective category of a respective item based at least in part on an association between a respective first attribute and a respective second attribute corresponding to items extracted from similar image data;
receive image data including representations of a plurality of items;
determine the respective attributes for the plurality of items, the respective attributes being extracted from the image data and corresponding to features of the plurality of items;
determine correlations between the plurality of items, based at least in part on the respective determined attributes;
determine, using the trained machine learning model, the respective category for each item of the plurality of items, based at least in part on the respective correlations;

generate a style profile for related items of the plurality of items, the related items including at least one of items within the same category or items sharing at least one attribute; and provide, for display, representations of items associated with the style profile, the representations of items being different from and including more items than the plurality of items.

15. The system of claim 14, wherein the attributes include at least one of an item type, an item style, a size, a texture, a material, or a brand.

16. The system of claim 14, wherein the instructions, when executed by the at least one computing device processor, cause the system to:

receive a query corresponding to a request for an item for sale in an online marketplace;

determine at least one query attributes associated with the query;

analyze the style profile for corresponding attributes to the query;

match at least one attribute of the style profile with at least one query attribute; and provide the item for review.

17. The system of claim 14, wherein the instructions, when executed by the at least one computing device processor, cause the system to:

analyze the image data to identify the representations of the plurality of items from the image data; and analyze the representations using one or more object recognition models to determine the respective attributes.

* * * * *